US009884257B2

(12) United States Patent
Wang et al.

(10) Patent No.: US 9,884,257 B2
(45) Date of Patent: Feb. 6, 2018

(54) METHOD FOR PREVENTING MISOPERATIONS OF INTELLIGENT TERMINAL, AND INTELLIGENT TERMINAL

(71) Applicant: TENCENT TECHNOLOGY (SHENZHEN) COMPANY LIMITED, Shenzhen, Guangdong (CN)

(72) Inventors: Junming Wang, Shenzhen (CN); Zhonghua Yu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 940 days.

(21) Appl. No.: 14/260,464

(22) Filed: Apr. 24, 2014

(65) Prior Publication Data

US 2014/0256439 A1    Sep. 11, 2014

Related U.S. Application Data

(63) Continuation of application No. PCT/CN2014/072829, filed on Mar. 4, 2014.

(30) Foreign Application Priority Data

Mar. 6, 2013  (CN) .................. 2013 1 0071499

(51) Int. Cl.
*A63F 13/20*   (2014.01)
*A63F 13/822*   (2014.01)
(Continued)

(52) U.S. Cl.
CPC ........ *A63F 13/822* (2014.09); *A63F 13/2145* (2014.09); *A63F 13/422* (2014.09)

(58) Field of Classification Search
CPC .......... A63F 13/06; A63F 13/12; A63F 13/20; A63F 13/2145; A63F 2300/1075; G06F 3/048; G06F 3/0484; G06F 2203/04806
(Continued)

(56) References Cited

U.S. PATENT DOCUMENTS

2002/0142833 A1* 10/2002 Tsuchida ............... A63F 13/10
                                                      463/30
2003/0190951 A1* 10/2003 Matsumoto .......... A63F 13/10
                                                      463/30
(Continued)

FOREIGN PATENT DOCUMENTS

CN    101335916 A    12/2008
CN    101685343 A    3/2010
(Continued)

OTHER PUBLICATIONS

State Intellectual Property Office of the P.R. China (ISR/CN), "International Search Report for PCT/CN2014/072829", China, dated May 12, 2014.
(Continued)

*Primary Examiner* — Michael Cuff
(74) *Attorney, Agent, or Firm* — Tim Tingkang Xia, Esq.; Locke Lord LLP (57) ABSTRACT

One aspect of the invention is directed to a method for preventing misoperations of an intelligent terminal, which includes detecting gesture operation information of a touch screen corresponding to a location around a non-player-controlled character (NPC) in a game; determining whether the detected gesture operation information includes first gesture information; and shielding game characters of non-NPC when the detected gesture operation information con-
(Continued)

tains the first gesture information. The method can prevent a misoperation of the intelligent terminal, thereby improving user experience.

11 Claims, 4 Drawing Sheets

(51) Int. Cl.
    *A63F 13/422*     (2014.01)
    *A63F 13/2145*     (2014.01)

(58) Field of Classification Search
    USPC .......................................................... 463/36
    See application file for complete search history.

(56) References Cited

U.S. PATENT DOCUMENTS

| | | | |
|---|---|---|---|
| 2004/0143852 A1* | 7/2004 | Meyers | A63F 13/12 725/133 |
| 2009/0150160 A1* | 6/2009 | Mozer | G06F 3/011 704/275 |
| 2011/0021272 A1* | 1/2011 | Grant | A63F 13/10 463/30 |
| 2013/0157760 A1* | 6/2013 | Boudville | G06K 7/12 463/31 |
| 2013/0184064 A1* | 7/2013 | Manning | G07F 17/3211 463/25 |
| 2014/0235327 A1* | 8/2014 | Aoki | G07F 17/3202 463/25 |

FOREIGN PATENT DOCUMENTS

| | | |
|---|---|---|
| CN | 101699452 A | 4/2010 |
| CN | 101808155 A | 8/2010 |
| CN | 102184077 A | 9/2011 |
| CN | 102799376 A | 11/2012 |
| CN | 102902483 A | 1/2013 |

OTHER PUBLICATIONS

State Intellectual Property Office of the P.R. China, "First Office Action and Search Report for 2013100714990", China, dated Feb. 28, 2015.

State Intellectual Property Office of the P.R. China, "Second Office Action for 2013100714990", China, dated Oct. 10, 2015.

* cited by examiner

METHOD FOR PREVENTING MISOPERATIONS OF INTELLIGENT TERMINAL, AND INTELLIGENT TERMINAL

CROSS-REFERENCE TO RELATED APPLICATION

This application is a continuation application of International Patent Application No. PCT/CN2014/072829, filed Mar. 4, 2014, which itself claims the priority to Chinese Patent Application No. 201310071499.0, filed on Mar. 6, 2013 in the State Intellectual Property Office of P.R. China, which is hereby incorporated herein in its entirety by reference.

FIELD OF THE INVENTION

The present invention relates generally to the field of communications, and more particularly to a method for preventing misoperations of an intelligent terminal, an intelligent terminal, and a non-transitory computer-readable medium storing instructions which, when executed by one or more processors, cause the intelligent terminal to perform the method for preventing misoperations.

BACKGROUND OF THE INVENTION

The background description provided herein is for the purpose of generally presenting the context of the present invention. Work of the presently named inventors, to the extent it is described in this background section, as well as aspects of the description that may not otherwise qualify as prior art at the time of filing, are neither expressly nor impliedly admitted as prior art against the present invention.

With rapid popularization of intelligent mobile phones or tablet computers, the intelligent mobile phones or tablet computers become very popular, and in particular, various applications installed on these intelligent mobile phones or tablet computers are widely used by more and more users.

For example, game applications in the intelligent mobile phones or tablet computers totally change the landscape of game playing, and allow users to play these games on the intelligent mobile phones or tablet computers at anytime and anywhere.

Currently, most intelligent mobile phones or tablet computers are predominantly provided with a touch screen. A game player can control a game through operations on the touch screen.

In a game program, such as an online game, many online game players can play the game. Generally a game player and a non-player-controlled character (NPC) perform an NPC dialogue to execute various tasks in the game or obtain game information. However, game players are large in number, so an NPC is easily masked by the character of another game player. At this time, when the current game player clicks the NPC for a dialogue with a finger on the touch screen, it is easy to pick the character of another game player instead of the NPC, therefore it prevent the current game player from having a dialogue with the NPC. When an operation is made with a finger on the touch screen of an intelligent mobile phone or a tablet computer, a non-NPC may be picked by mistake.

In order to prevent a game player from picking a non-NPC by mistake, the game player may have to select an option of masking other game characters in a system setting interface in a game application to achieve this objective. However, this operation may require the game player to stop the current game process and then select a corresponding function option in the system setting interface. Sometimes, it is frustrating and tampers enthusiasm of the game player. Additionally, this setting is tedious, and deteriorates user experience.

Therefore, a heretofore unaddressed need exists in the art to address the aforementioned deficiencies and inadequacies.

SUMMARY OF THE INVENTION

Certain aspects of the present invention are directed to a method for preventing misoperations of an intelligent terminal, an intelligent terminal, and a non-transitory computer-readable medium storing instructions which, when executed by one or more processors, cause the intelligent terminal to perform the method for preventing misoperations. According to the present invention, the misoperations of the intelligent terminal can be prevented, thereby improving user experience.

In one aspect of the present invention, the method for preventing misoperations of an intelligent terminal includes detecting gesture operation information of a touch screen corresponding to a location around a non-player-controlled character (NPC) in a game; determining whether the detected gesture operation information contains first gesture information; and shielding game characters of non-NPC when the detected gesture operation information contains the first gesture information.

In another aspect of the present invention, the intelligent terminal includes a detecting unit, configured to detect gesture operation information of a touch screen corresponding to a location around an NPC in a game; a determining unit, configured to determine whether the detected gesture operation information contains first gesture information; and an executing unit, configured to shield game characters of non-NPC when the detected gesture operation information contains the zoom-in gesture information.

In a further aspect, the present invention, the non-transitory computer-readable medium stores instructions which, when executed by one or more processors, cause the intelligent terminal to perform the method for preventing misoperations.

According to the present invention, when a gesture operation at a location around an NPC contains a first gesture, such as a zoom-in gesture or a zoom-out gesture, game characters of non-NPC are shielded, thereby enabling the game player to accurately click the NPC, and establishing a dialogue between the game player and the NPC. Further, it is not required to interrupt the current game process, i.e., there is no need to stop the current game process firstly, and then enter the system setting interface to select a corresponding function option as what is required in the prior art. Moreover, operation steps are very simple, where the game characters of another game player can be shielded only in need of a touch gesture operation, so that the misoperations of the intelligent terminal can be prevented, thereby improving user experience.

These and other aspects of the present invention will become apparent from the following description of the preferred embodiment taken in conjunction with the following drawings, although variations and modifications therein is affected without departing from the spirit and scope of the novel concepts of the present invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are configured to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method is executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules is executed using a single (shared) processor. In addition, some or all code from multiple modules is stored by a single (shared) memory. The term "group", as used herein, means that some or all code from a single module is executed using a group of processors. In addition, some or all code from a single module is stored using a group of memories.

The systems and methods described herein are implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the embodiments of the present invention in conjunction with the accompanying drawings in FIGS. 1-4. It should be understood that specific embodiments described herein are merely intended to explain the present invention, but not intended to limit the present invention. In accordance with the purposes of this invention, as embodied and broadly described herein, this invention, in certain aspects, relates to a method for preventing misoperations of an intelligent terminal, an intelligent terminal, and a non-transitory computer-readable medium storing instructions which, when executed by one or more processors, cause the intelligent terminal to perform the method for preventing misoperations.

Figure 1:
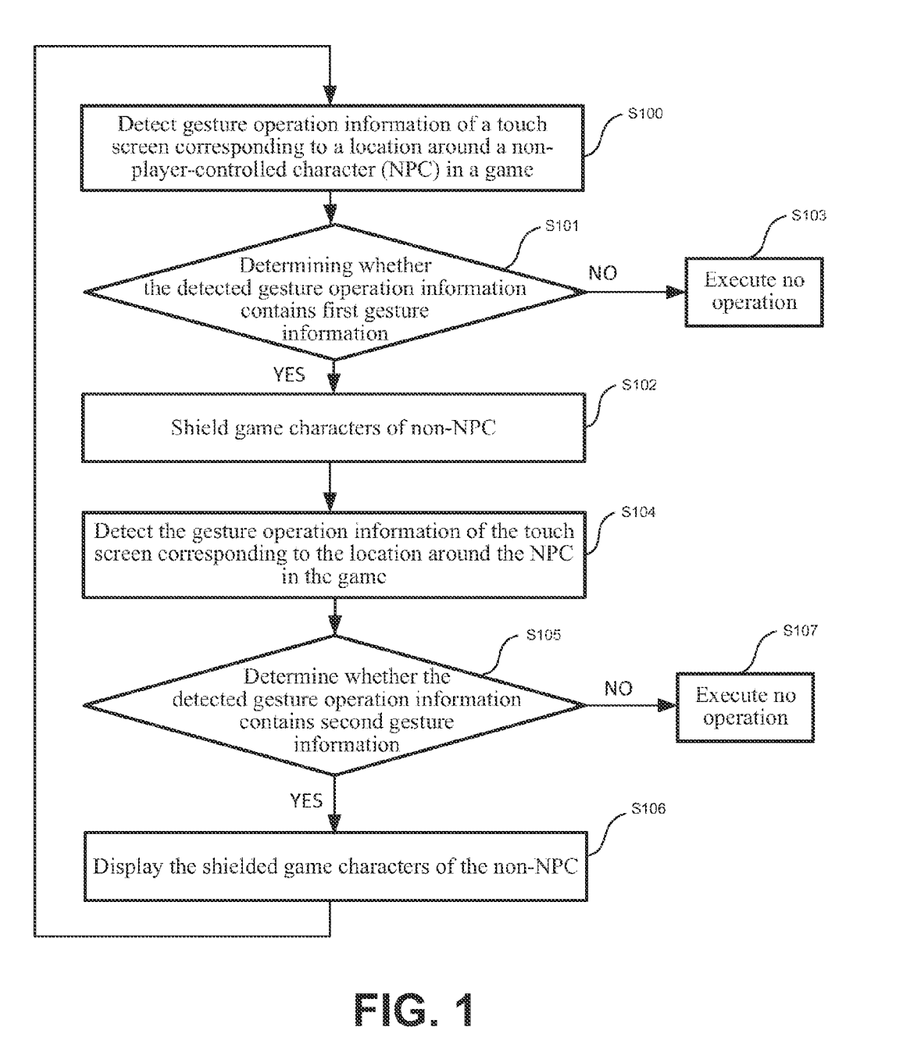
FIG. 1 shows schematically a flow chart of a method for preventing misoperations of an intelligent terminal according to one embodiment of the present invention.

Referring to FIG. 1, a flow chart of a method for preventing misoperations of an intelligent terminal is schematically shown according to one embodiment of the present invention. According to the present invention, the intelligent terminal includes, but is not limited to, a game console, a personal computer, a tablet, a smart phone or mobile phone, a smart television, or any other user-side gaming device.

In this exemplary embodiment, an intelligent mobile phone is utilized as an example of the intelligent terminal for illustration. In certain embodiments, multiple applications are installed in the intelligent mobile phone, where the applications include a game application. The intelligent mobile phone can be an intelligent mobile phone with a touch screen. A user can perform various gesture operations on the touch screen. A gesture operation of the user on the touch screen can be detected by a detecting circuit in the intelligent mobile phone. In certain embodiments, when the intelligent mobile phone is running a game application, the user can operate the currently running game application through the touch screen.

As shown in FIG. 1, the method for preventing a misoperation of the intelligent terminal in this exemplary embodiment includes the following steps/operations:

At step S100, gesture operation information of a touch screen corresponding to a location around an NPC in a game is detected. According to the embodiment, when the user needs to operate a game application through the touch screen, the user can make different types of gesture operations on the touch screen. The gesture operations include, but are not limited to, a zoom-in gesture operation, or a zoom-out gesture operation, or a slide gesture operation, or a click gesture operation. When the user makes a gesture operation on the touch screen corresponding to a location around an NPC in the game, the intelligent mobile phone detect the gesture operation information. In one embodiment, the intelligent mobile phone firstly detects a touch operation track of a game player on the touch screen, and then identifies gesture information corresponding to the touch operation track. In one embodiment, the location around the NPC is corresponding to an area centered at the NPC with a radius at a preset distance. The technical means of detecting a touch operation track of a game player on the touch screen and identifying gesture information corresponding to the touch operation track may be known to one skilled in the art, whose details are not described herein.

At step S101, whether the detected gesture operation information includes first gesture information is determined. The first gesture can be any one of gestures such as a zoom-in gesture, a zoom-out gesture, a slide gesture, a click gesture, and other predefined gestures. For the purpose of illustration of the present invention, the first gesture is assigned with a zoom-in gesture in this specification.

In the exemplary embodiment, when the detected gesture operation information includes the zoom-in gesture information, step S102 is executed. Otherwise, when the detected gesture operation information does not include the zoom-in gesture information, step S103 is executed, i.e., no operation is executed.

At step S102, game characters of non-NPC are shielded. According to the embodiment, other game characters except the NPC and the current game player character are shielded. In a game program, the current game player character cannot be shielded since if the game character of the current game player is shielded, the game cannot be performed. Accordingly, this operation (step S102) is to shield the game characters of the non-NPC. The term, "shielding" used herein the specification refers to non-displaying, i.e., the game characters of the non-NPC are not displayed on the screen of the game. After the game characters of the non-NPC are shielded (not displayed), the game player can accurately click the NPC, so that a dialogue between the game player and the NPC is established, which requires no interruption to the current game process. Moreover, operation steps are very simple, where the game characters of another game player can be shielded only in need of a touch gesture operation. Therefore, the misoperations of the intelligent terminal can be prevented, which improves user experience.

In certain embodiments, after the game characters of the non-NPC are shielded by the current game player, the current game player may need to see game characters of other game players to meet demand of the game. In this case, the shielded game characters need to be restored. Accordingly, the gesture operation information of the touch screen corresponding to the location around the NPC in the game is detected at step S104.

At step S105, whether the detected gesture operation information includes second gesture information is determined. The second gesture can be any one of gestures such as a zoom-in gesture, a zoom-out gesture, a slide gesture, a click gesture, and other predefined gestures. The second gesture is different from the first gesture. For the purpose of illustration of the present invention, the second gesture is assigned with a zoom-out gesture in this specification.

In this embodiment, when the detected gesture operation information includes the zoom-out gesture information, step S106 is executed. Otherwise, when the detected gesture operation information does not include the zoom-out gesture information, step S107 is executed, i.e., no operation is executed.

At step S106, the shielded game characters of the non-NPC are displayed. That is, the shielded game characters of the non-NPC (i.e., other game players) are restored.

After the shielded game characters of the other game players are restored, namely, the original scenario of the game is restored, if the current game player needs to have a dialogue with the NPC, the current game player needs to re-execute steps S100-S101 as disclosed above.

According to the present invention, after the game characters of the other game players (non-NPC) are shielded, when a gesture operation at the location around an NPC is a zoom-out gesture (second gesture) operation, the shielded game characters of non-NPC are restored, so that the original scenario of the game is restored, which requires no interruption to the current game process (namely, there is no need to firstly stop the current game process, and then enter the system setting interface to select a corresponding restoration function option as what is required in the prior art). Furthermore, operation steps are very simple, where the shielded game characters of the other game players can be restored only in need of a touch gesture operation, so that the misoperations of the intelligent terminal can be prevented, thereby improving user experience.

Figure 2:
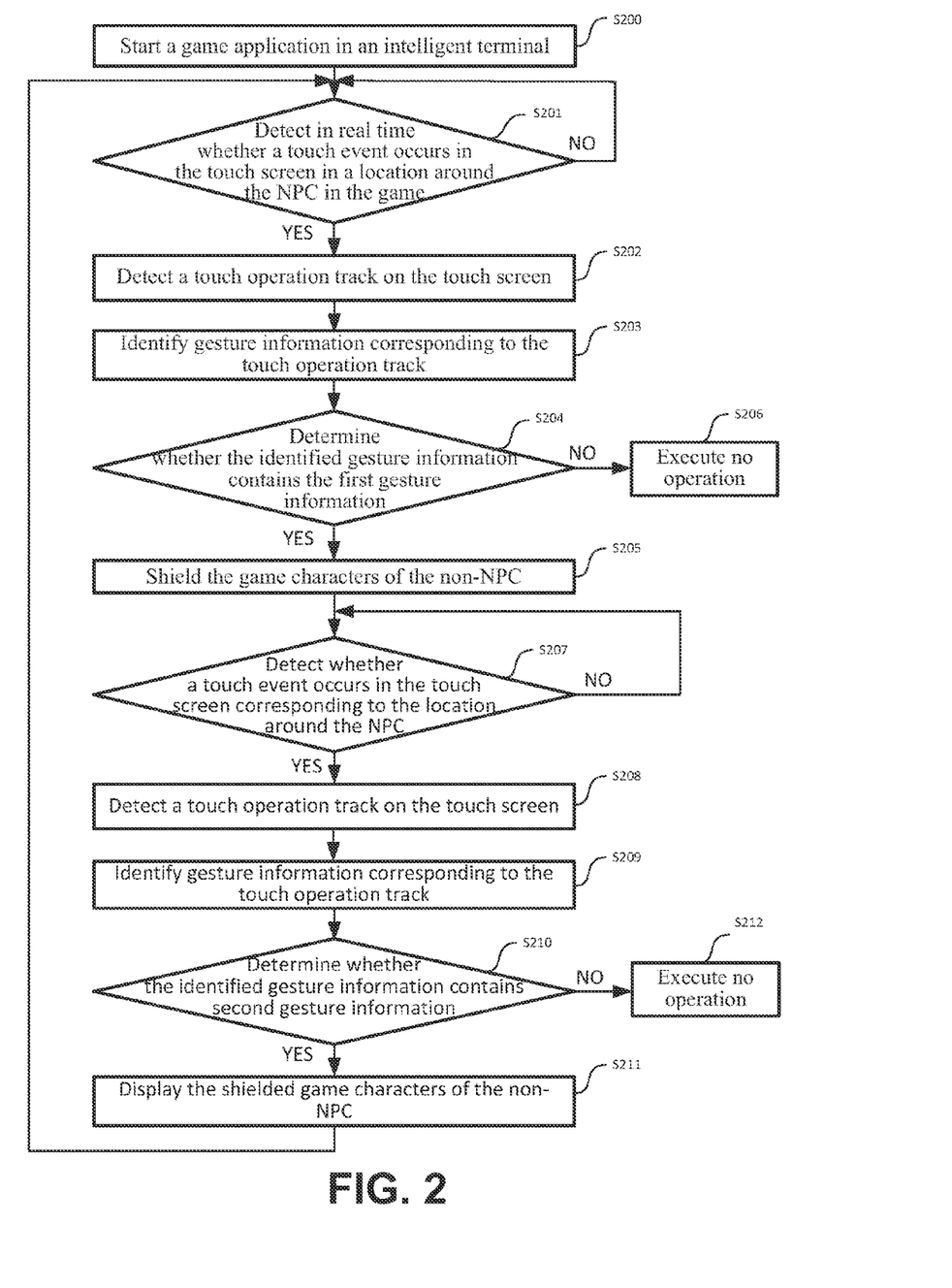
FIG. 2 shows schematically a flow chart of a method for preventing misoperations of an intelligent terminal according to another embodiment of the present invention.

Referring to FIG. 2, a flow chart of a method for preventing misoperations of an intelligent terminal is schematically according to another embodiment of the present invention. In the exemplary embodiment, an intelligent mobile phone is taken as an example for illustration. Multiple applications are installed in the intelligent mobile phone, where the applications include a game application. The intelligent mobile phone can be an intelligent mobile phone with a touch screen. It should be noted that other types of terminal devices can also be utilized to practice the present invention. In certain embodiment, the method includes the following steps (or operations).

At first (step s200), a game application is run in the intelligent mobile phone.

Then, whether a touch event occurs in the touch screen corresponding to the location around the NPC in the game is detected in real time at step S201. According to the present invention, when the intelligent mobile phone runs the game application, the intelligent mobile phone may detect in real time whether a touch event occurs in the touch screen. Specifically, the intelligent mobile phone detects whether a touch event occurs in the touch screen corresponding to the location around the NPC in the game. When the game player needs to perform an operation on the NPC, a touch operation needs to be performed on the touch screen corresponding to the location around the NPC, and at this time, the intelligent mobile phone can detect that a touch event occurs in the touch screen corresponding to the location around the NPC. When it is detected that a touch event occurs, step S202 is executed; otherwise, when no touch event occurs, step S201 continues to be executed. In this embodiment, the location around an NPC can be understood as an area centered at the NPC with a radius at a preset distance.

At step S202, a touch operation track of a game player on the touch screen is detected. Then, gesture information corresponding to the touch operation track is identified at step S203.

In this embodiment, when the user needs to operate a game through the touch screen, the user can make multiple touch operation tracks, the touch operation tracks are identified as gesture operations, and the gesture operations can include a zoom-in gesture operation, or a zoom-out gesture operation, or a slide gesture operation, or a click gesture operation. The technical means of detecting a touch operation track of a game player on the touch screen, and then identifying gesture information corresponding to the touch operation track may be known to one skilled in the art, whose details are not described herein.

At step S204, whether the identified gesture information includes zoom-in gesture information is determined. In this embodiment, when the identified gesture information includes zoom-in gesture (first gesture) information, step S205 is executed; otherwise, when the identified gesture information does not include the zoom-in gesture information, step S206 is executed, namely, no operation is executed.

At step S205, game characters of non-NPC are shielded. According to the embodiment, other game characters except the NPC and the current game player character are shielded. In a game program, the current game player character cannot be shielded since if the game character of the current game player is shielded, the game cannot be performed. Accordingly, this operation (step S205) is to shield the game characters of the non-NPC. The term, "shielding" used herein the specification refers to non-displaying, i.e., the game characters of the non-NPC are not displayed on the screen of the game. After the game characters of the non-NPC are shielded (not displayed), the game player can accurately click the NPC, so that a dialogue between the game player and the NPC is established, which requires no interruption to the current game process. Moreover, operation steps are very simple, where the game characters of another game player can be shielded only in need of a touch gesture operation. Therefore, the misoperations of the intelligent terminal can be prevented, which improves user experience.

In certain embodiments, after the game characters of the non-NPC are shielded by the current game player, the current game player may need to see game characters of other game players to meet demand of the game. In this case, the shielded game characters need to be restored.

In one embodiment, whether a touch event occurs in the touch screen corresponding to the location around the NPC is detected at step S207.

At step S208, a touch operation track of a game player on the touch screen is detected. Then, gesture information corresponding to the touch operation track is identified at step S209.

At step S210, whether the identified gesture information includes zoom-out gesture information is determined. In this embodiment, when the identified gesture information includes zoom-out gesture (second gesture) information, step S211 is executed; otherwise, when the identified gesture information does not include the zoom-out gesture information, step S212 is executed, i.e., no operation is executed.

At step S211, the shielded game characters of the non-NPC are displayed. Accordingly, the shielded game characters of the other game players are restored and the original scenario of the game is restored. After the shielded game characters of the other game players are restored, namely, the original scenario of the game is restored, if the current game player needs to have a dialogue with the NPC, the current game player needs to re-execute steps S201-S205 as disclosed above.

According to the present invention, when a gesture operation at a location around an NPC is determined as a zoom-in gesture, the game characters of the non-NPC are shielded, thereby enabling the game player to accurately click the NPC, and establishing a dialogue between the game player and the NPC. In addition, there is no need to interrupt the current game process, i.e., it is not required to firstly stop the current game process, and then enter the system setting interface to select a corresponding function option as what is required in the prior art. Further, operation steps are very simple, where the game characters of the other game players (non-NPC) can be shielded only in need of a touch gesture operation. Accordingly, the misoperations of the intelligent terminal can be prevented, thereby improving user experience.

Meanwhile, after the game characters of the other game player are shielded, when a gesture operation at a location around an NPC is determined as a zoom-out gesture, the shielded game characters of the other game players are restored, so that the original scenario of the game can be restored. Also, it is not required to interrupt the current game process (namely, it is not required to firstly stop the current game process, and then enter the system setting interface to select a corresponding restoration function option as what is required in the prior art). Further, operation steps are very simple, where the shielded game character of the other game players can be restored only in need of a touch gesture operation. Accordingly, the misoperations of the intelligent terminal can be prevented, thereby finally improving user experience.

Figure 3:
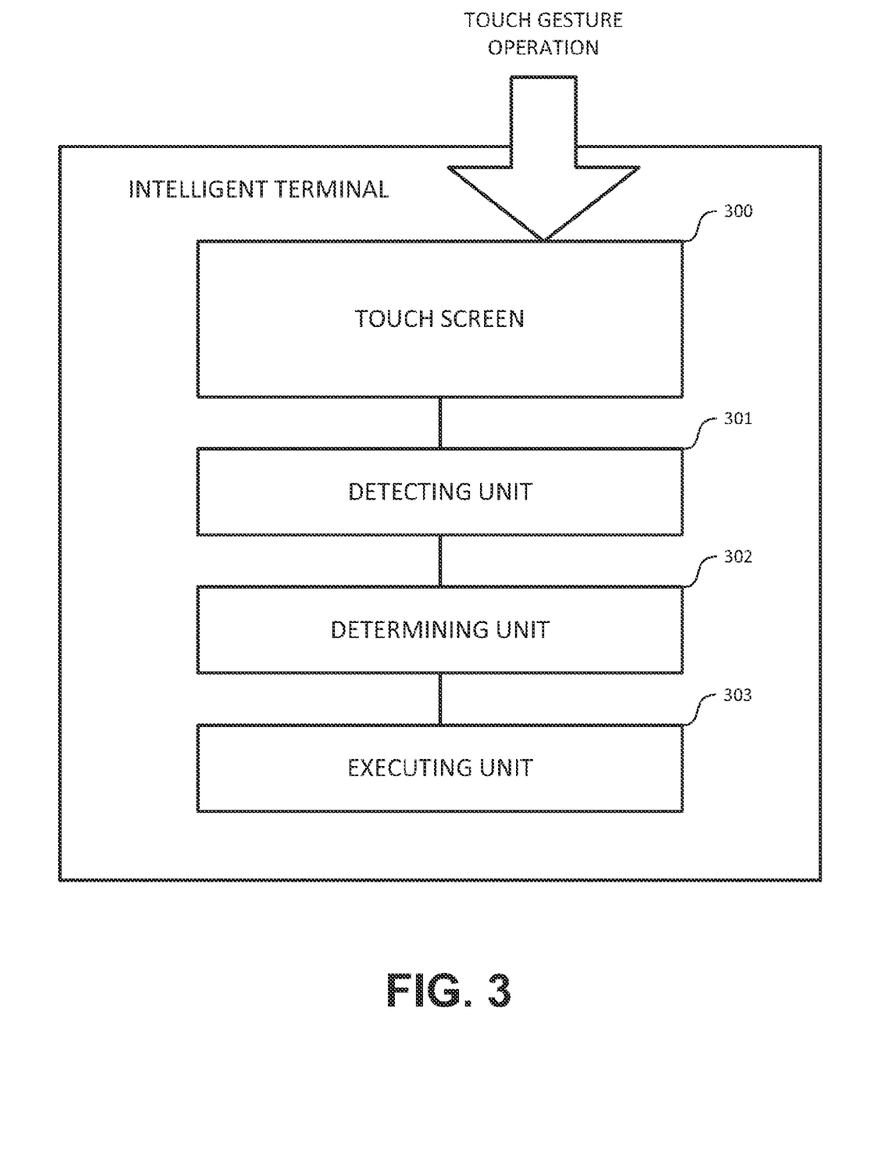
FIG. 3 shows schematically a structural diagram of an intelligent terminal according to one embodiment of the present invention.

FIG. 3 shows schematically a structural diagram of an intelligent terminal according to one embodiment of the present invention.

In certain embodiments, the intelligent terminal can be, but is not limited to, a game console, a personal computer, a tablet, a smart phone or mobile phone, a smart television, or any other user-side gaming device.

In this exemplary embodiment shown in FIG. 3, the intelligent terminal includes a touch screen 300, a detecting unit 301, a determining unit 302, and an executing unit 303.

In one embodiment, the detecting unit 301 is configured to detect gesture operation information of the touch screen 300 corresponding to a location around an NPC in a game. When the user needs to operate a game through the touch screen 300, the user can make multiple gesture operations on the touch screen 300. In certain embodiments, the gesture operations include a zoom-in gesture operation, or a zoom-out gesture operation, or a slide gesture operation, or a click gesture operation, or other predefined gesture operation. When the user makes a gesture operation on the touch screen 300 corresponding to the location around an NPC in the game, the intelligent mobile phone detects the gesture operation information. In this embodiment, the intelligent mobile phone firstly detects a touch operation track of a game player on the touch screen 300, and then identifies gesture information corresponding to the touch operation track. The technical means of detecting the touch operation track of the game player on the touch screen 300, and then identifying the gesture information corresponding to the touch operation track is known to one skilled in the art, and is not described in details herein. In certain embodiments, the location around an NPC is an area centered at the NPC with a radius at a certain preset distance.

In one embodiment, the determining unit 302 is configured to determine whether the detected gesture operation information includes zoom-in gesture (first gesture) information.

In one embodiment, the executing unit 303 is configured to shield game characters of non-NPC when the detected gesture operation information includes the zoom-in gesture information. According to this embodiment, other game characters except the NPC and the current game player character are shielded. In a game program, the current game player character cannot be shielded (if the game character of the player is shielded, the game cannot be performed), and therefore, the executing unit 303 is used to shield the game characters of the non-NPC. In certain embodiments, the term, "shielding", as used herein can be understood as non-displaying, i.e., the game characters of the non-NPC are not displayed on the screen of the game. After the game characters of the non-NPC are not displayed (shielded), the game player can accurately click the NPC, so that a dialogue between the game player and the NPC is established. According to the present invention, it is not required to interrupt the current game process, and further, operation steps are very simple, where the game characters of the other non-NPC game players can be shielded only in need of a touch gesture operation. Therefore, the misoperations of the intelligent terminal can be prevented, thereby improving user experience.

In addition, when the detected gesture operation information does not include the zoom-in gesture information, the executing unit 303 does not perform any operation.

In certain embodiments, after the game characters of the non-NPC are shielded by the current game player, if the current game player needs to see game characters of other game players to meet demand of the game, the shielded game characters need to be restored. Therefore, the detecting unit 301 is configured to further detect, after the executing unit 303 shields the game characters of the non-NPC, the gesture operation information of the touch screen corresponding to the location around the NPC in the game. The determining unit 302 is also configured to further determine whether the gesture operation information detected by the detecting unit 301 includes zoom-out gesture (second gesture) information. The executing unit 303 is further configured to display, when the determining unit 302 determines that the gesture operation information detected by the detecting unit 301 includes the zoom-out gesture information, the shielded game characters of the non-NPC. Accordingly, the shielded game characters of the non-NPC are restored, i.e., the shielded game characters of the other game players are restored.

In operation, after the game characters of the other game players are shielded, when a gesture operation at the location around an NPC is determined as a zoom-out gesture, the shielded game characters of the other game players are displayed (restored), so that the original scenario of the game is restored. According to the present invention, it is not required to interrupt the current game process (namely, it is not required to firstly stop the current game process, and then enter the system setting interface to select a corresponding restoration function option as what is required in the prior art), and further, operation steps are very simple, where the shielded game character of another game player can be restored only in need of a touch gesture operation. Therefore, the misoperations of the intelligent terminal can be prevented, thereby finally improving user experience.

Figure 4:
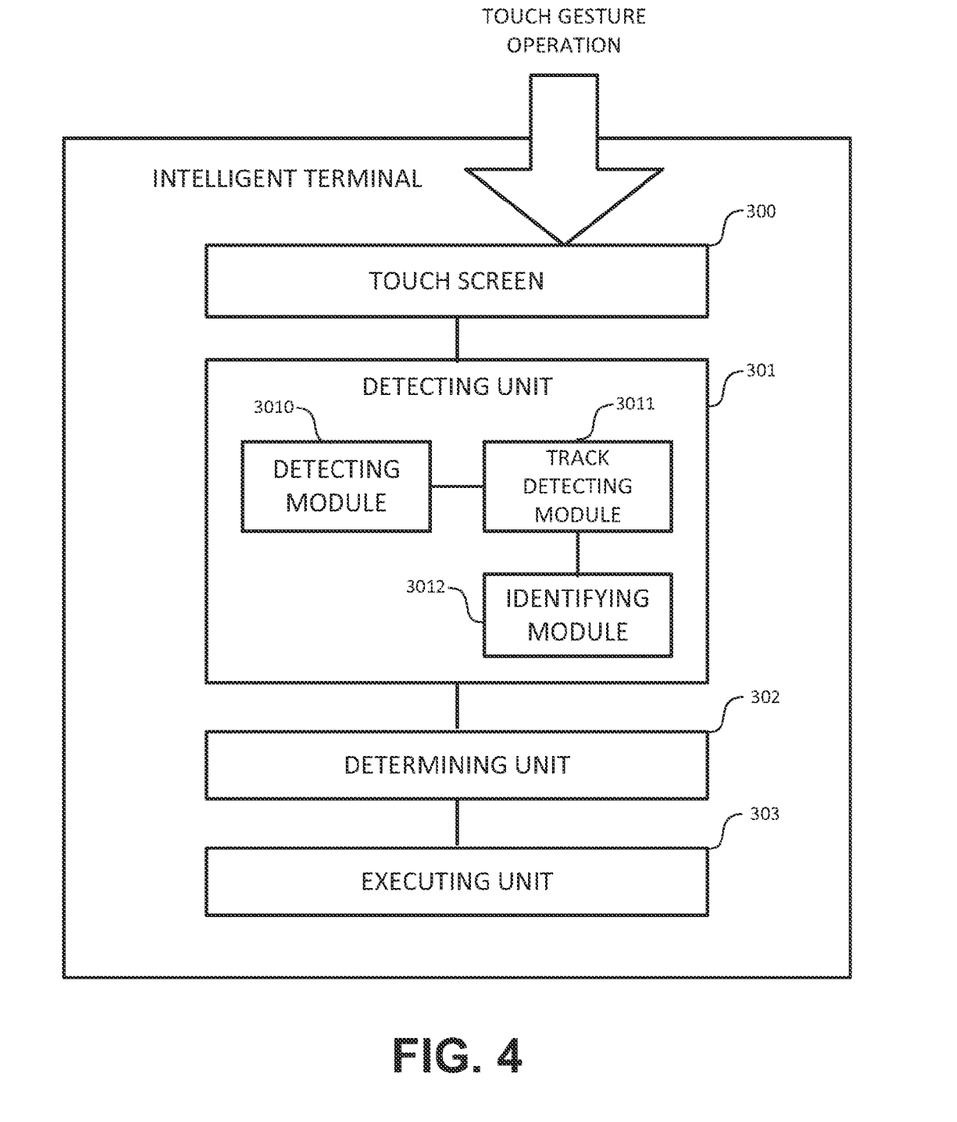
FIG. 4 shows schematically a structural diagram of an intelligent terminal according to another embodiment of the present invention.

FIG. 4 shows schematically a structural diagram of an intelligent terminal according to one embodiment of the present invention. In this embodiment, the intelligent terminal includes a touch screen 300, a detecting unit 301, a determining unit 302, and an executing unit 303.

In one embodiment, the detecting unit 301 includes a detecting module 3010, a track detecting module 3011, and an identifying module 3012.

In one embodiment, the detecting module 3010 is configured to detect in real time whether a touch event occurs in the touch screen 300 corresponding to the location around the NPC in the game. When the intelligent mobile phone runs the game application, the intelligent mobile phone may detect in real time whether a touch event occurs in the touch screen 300. Specifically, the intelligent mobile phone detects whether a touch event occurs in the touch screen 300 corresponding to the location around the NPC in the game. In certain embodiments, when the game player needs to perform an operation on the NPC, a touch operation needs to be performed on the touch screen corresponding to the location around the NPC. At this time, the intelligent mobile phone can detect whether a touch event occurs in the touch screen 300 corresponding to the location around the NPC.

In one embodiment, the track detecting module 3011 is configured to detect a touch operation track of the game player on the touch screen when the detecting module 3010 detects that a touch event occurs. When the detecting module 3010 detects that no touch event occurs, the detecting module 3010 continues to execute the detecting operation. In certain embodiments, the location around an NPC is an area centered at the NPC with a radius at a certain preset distance.

In one embodiment, the identifying module 3012 is configured to identify gesture information corresponding to the touch operation track detected by the track detecting module 3011. In certain embodiments, when the user needs to operate a game through the touch screen, the user can make multiple touch operation tracks. The touch operation tracks are identified as gesture operations. The gesture operations include, but are not limited to, a zoom-in gesture operation, or a zoom-out gesture operation, or a slide gesture operation, or a click gesture operation, or other predefined gesture operations.

In one embodiment, the determining unit 302 is configured to determine whether the gesture operation information identified by the identifying module 3012 includes zoom-in gesture information.

In one embodiment, the executing unit 303 is configured to shield the game characters of the non-NPC when the determining unit 302 determines that the gesture operation information identified by the identifying module 3012 includes zoom-in gesture information. In this embodiment, it can be understood that other game characters except the NPC and the current game player character are shielded. In a game program, the current game player character cannot be shielded since if the game character of the player is shielded, the game cannot be performed. Therefore, in this embodiment, the executing unit 303 is used to shield the game characters of the non-NPC. According to this embodiment, the shielding can be understood as non-displaying, namely, the game character of the non-NPC is not displayed on the screen of the game. After the game characters of the non-NPC are not displayed (shielded), the game player can accurately click the NPC, so that a dialogue between the game player and the NPC is established. According to the present invention, it is not required to interrupt the current game process, and operation steps are very simple, where the game character of another game player can be shielded only in need of a touch gesture operation, so that the misoperation of the intelligent terminal can be prevented, thereby improving user experience.

In one embodiment, when the detected gesture operation information does not include the zoom-in gesture information, the executing unit 303 does not perform any operation.

After the game characters of the non-NPC are shielded by the current game player, if the current game player needs to see game characters of the other game players to meet demand of the game, the shielded game characters need to be restored. In one embodiment, the detecting module 3010 is configured to further detect, after the executing unit 303 shields the game characters of the non-NPC, whether a touch event occurs in the touch screen corresponding to the location around the NPC; the track detecting module 3011 is further configured to detect a touch operation track of the game player on the touch screen; and the identifying module 3012 is further configured to identify gesture information corresponding to the touch operation track detected by the track detecting module 3011. The determining unit 302 is further configured to determine whether the gesture operation information identified by the identifying module 3012 includes zoom-out gesture information. The executing unit 303 is further configured to display the shielded game characters of the non-NPC when the determining unit 302 determines that the gesture operation information identified by the identifying module 3012 includes the zoom-out gesture information. As such, it can be understood that the shielded game characters of the non-NPC are restored, namely, the shielded game characters of the other game players are restored.

According to the present invention, after the game characters of the other game players are shielded, when a gesture operation at the location around the NPC is detected to be a zoom-out gesture, the shielded game characters of the other game players are restored, so that the original scenario of the game can be restored. Also, it is not required to interrupt the current game process (i.e., there is no need to stop the current game process, and then enter the system setting interface to select a corresponding restoration function option as what is required in the prior art). Further, operation steps are very simple, where the shielded game character of another game player can be restored only in need of a touch gesture operation. Therefore, the misoperations of the intelligent terminal can be prevented, thereby improving user experience.

It should be noted that all or a part of the steps according to the embodiments of the present invention is implemented by hardware or a program instructing relevant hardware. Yet another aspect of the invention provides a non-transitory computer readable storage medium/memory which stores computer executable instructions or program codes. The computer executable instructions or program codes enable a computer or a similar computing apparatus to complete various operations in the above disclosed method for preventing misoperations of an intelligent terminal. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for preventing misoperations of an intelligent terminal, comprising:
    detecting, by a detecting circuit of the intelligent terminal, gesture operation information of a user on a touch screen corresponding to a location around a non-player-controlled character (NPC) in a game, wherein the detecting circuit comprises:
        a detecting module to detect in real time whether a touch event occurs in the touch screen corresponding to the location around the NPC in the game;
        a track detecting module to detect a touch operation track of the game player on the touch screen when the detecting module detects that the touch event occurs; and
        an identifying module to identify the gesture information corresponding to the touch operation track detected by the track detecting module;
    determining, by the intelligent terminal, whether the detected gesture operation information contains first gesture information;
    shielding, by the intelligent terminal, player controlled game characters not to be displayed on the touch screen when the detected gesture operation information contains the first gesture information;
    detecting, by the detecting circuit of the intelligent terminal, another gesture operation information of the user on the touch screen corresponding to the location around the NPC in the game;
    determining, by the intelligent terminal, whether the detected another gesture operation information contains second gesture information, wherein the second gesture information is different from the first gesture information; and
    displaying, by the intelligent terminal, the shielded player controlled game characters on the touch screen when the detected another gesture operation information contains the second gesture information, thus preventing the misoperations of the intelligent terminal without interrupting a process of the game.

2. The method according to claim 1, wherein the step of detecting the gesture operation information of the user on the touch screen corresponding to the location around the NPC in the game comprises:
    detecting, by the detecting module, in real time whether the touch event occurs in the touch screen corresponding to the location around the NPC in the game;
    detecting, the track detecting module, the touch operation track on the touch screen when the touch event occurs; and
    identifying, by the identifying module, the gesture information corresponding to the touch operation track.

3. The method according to claim 2, wherein the step of determining whether the detected gesture operation information contains the first gesture information comprises:

determining whether the identified gesture information contains the first gesture information; and wherein the step of shielding player controlled game characters when the detected gesture operation information contains the first gesture information comprises:

shielding the player controlled game characters when the identified gesture information contains the first gesture information.

4. The method according to claim 1, wherein the first gesture information comprises one of zoom-in gesture information and zoom-out gesture information, and the second gesture information comprises the other of the zoom-in gesture information and the zoom-out gesture information.

5. An intelligent terminal, comprising:

a detecting circuit, configured to detect gesture operation information of a user on a touch screen corresponding to a location around a non-player-controlled character (NPC) in a game, wherein the detecting circuit comprises:

a detecting module to detect in real time whether a touch event occurs in the touch screen corresponding to the location around the NPC in the game;

a track detecting module to detect a touch operation track of the game player on the touch screen when the detecting module detects that the touch event occurs; and an identifying module to identify the gesture information corresponding to the touch operation track detected by the track detecting module;

a determining unit, configured to determine whether the detected gesture operation information contains first gesture information; and an executing unit, configured to shield player controlled game characters not to be displayed on the touch screen when the detected gesture operation information contains the first gesture information, wherein the detecting circuit is further configured to detect, after the player controlled game characters are shielded, another gesture operation information of the user on the touch screen corresponding to the location around the NPC in the game, and to determine whether the detected another gesture operation information contains second gesture information, and wherein the executing unit is further configured to display the shielded player controlled game characters on the touch screen when the detected another gesture operation information contains the second gesture information, thus preventing the misoperations of the intelligent terminal without interrupting a process of the game.

6. The intelligent terminal according to claim 5, wherein the determining unit is further configured to determine whether the gesture information identified by the identifying module contains the first gesture information; and the executing unit is further configured to shield the player controlled game characters when the determining unit determines that the gesture information identified by the identifying module contains the first gesture information.

7. The method according to claim 5, wherein the first gesture information comprises one of zoom-in gesture information and zoom-out gesture information, and the second gesture information comprises the other of the zoom-in gesture information and the zoom-out gesture information.

8. A non-transitory computer-readable medium storing instructions which, when executed by one or more processors, cause an intelligent terminal to perform a method for preventing a misoperation, the method comprising:

detecting, by a detecting circuit of the intelligent terminal, gesture operation information of a user on a touch screen corresponding to a location around a non-player-controlled character (NPC) in a game, wherein the detecting circuit comprises:

a detecting module to detect in real time whether a touch event occurs in the touch screen corresponding to the location around the NPC in the game;

a track detecting module to detect a touch operation track of the game player on the touch screen when the detecting module detects that the touch event occurs; and an identifying module to identify the gesture information corresponding to the touch operation track detected by the track detecting module;

determining, by the intelligent terminal, whether the detected gesture operation information contains first gesture information;

shielding, by the intelligent terminal, player controlled game characters not to be displayed on the screen when the detected gesture operation information contains the first gesture information;

detecting, by the detecting circuit, another gesture operation information of the user on the touch screen corresponding to the location around the NPC in the game;

determining, by the intelligent terminal, whether the detected another gesture operation information contains second gesture information; and displaying, by the intelligent terminal, the shielded player controlled game characters on the touch screen when the detected another gesture operation information contains the second gesture information, thus preventing the misoperation of the intelligent terminal without interrupting a process of the game.

9. The non-transitory computer-readable medium according to claim 8, wherein the step of detecting the gesture operation information of the user on the touch screen corresponding to the location around the NPC in the game comprises:

detecting, by the detecting module, in real time whether the touch event occurs in the touch screen corresponding to the location around the NPC in the game;

detecting, the track detecting module, the touch operation track on the touch screen when the touch event occurs; and identifying, by the identifying module, the gesture information corresponding to the touch operation track.

10. The non-transitory computer-readable medium according to claim 9, wherein the step of determining whether the detected gesture operation information contains the first gesture information comprises:

determining whether the identified gesture information contains the first gesture information; and wherein the step of shielding player controlled game characters when the detected gesture operation information contains the first gesture information comprises:

shielding the player controlled game characters when the identified gesture information contains the first gesture information.

11. The non-transitory computer-readable medium according to claim 8, wherein the first gesture information comprises one of zoom-in gesture information and zoom-out gesture information, and the second gesture information comprises the other of the zoom-in gesture information and the zoom-out gesture information.

* * * * *